(12) United States Patent
Dodd

(10) Patent No.: US 11,975,927 B2
(45) Date of Patent: May 7, 2024

(54) ROTATABLE MATERIAL TRANSFER SYSTEM WITH ADJUSTMENT AND RELATED SYSTEM COMPONENTS

(71) Applicant: Fogg Filler Company, LLC, Holland, MI (US)

(72) Inventor: Trevor R. Dodd, Holland, MI (US)

(73) Assignee: FOGG FILLER COMPANY, LLC, Holland, MI (US)

( * ) Notice: Subject to any disclaimer, the term of this patent is extended or adjusted under 35 U.S.C. 154(b) by 0 days.

(21) Appl. No.: 17/943,736

(22) Filed: Sep. 13, 2022

(65) Prior Publication Data

US 2023/0080353 A1 Mar. 16, 2023

Related U.S. Application Data

(60) Provisional application No. 63/245,001, filed on Sep. 16, 2021.

(51) Int. Cl.
*B65G 47/84* (2006.01)
*B65G 21/20* (2006.01)

(52) U.S. Cl.
CPC ....... *B65G 47/846* (2013.01); *B65G 21/2072* (2013.01)

(58) Field of Classification Search
CPC .............. B65G 47/846; B65G 21/2072; B65G 2201/02
USPC ................................ 198/473.1, 474.1, 836.3
See application file for complete search history.

(56) References Cited

U.S. PATENT DOCUMENTS

| | | | |
|---|---|---|---|
| 2,324,312 A * | 7/1943 | Meyer | B67B 3/003 |
| | | | 198/463.4 |
| 3,527,336 A | 9/1970 | Johnston | |
| 3,975,260 A | 8/1976 | Peyton | |
| 4,075,086 A * | 2/1978 | Marsh, III | B65G 47/846 |
| | | | 198/803.11 |
| 4,982,835 A | 1/1991 | Butler | |
| 5,211,280 A | 5/1993 | Houde | |
| 5,291,988 A | 3/1994 | Leonard | |
| 5,492,218 A | 2/1996 | Falkowski | |
| 5,515,668 A | 5/1996 | Hunt | |
| 5,517,798 A | 5/1996 | Klopfenstein | |
| 5,558,200 A | 9/1996 | Whitby | |

(Continued)

FOREIGN PATENT DOCUMENTS

| | | |
|---|---|---|
| DE | 102011081754 A1 | 2/2013 |
| EP | 2566793 B1 | 12/2014 |

(Continued)

*Primary Examiner* — James R Bidwell
(74) *Attorney, Agent, or Firm* — THOMPSON HINE LLP

(57) ABSTRACT

A material transfer system includes one or more of the following features: (i) a rotatable conveyor assembly is configured to enable adjustment of a radial position of the item guide surface of each item pocket for adjusting pocket depth; (ii) the rotatable conveyor assembly is configured to enable adjustment of an arcuate offset distance between the item guide surface and the item push surface of each item pocket; and/or (iii) the guide surface is formed, at least in part, by at least one flexible rail that is adjustable between multiple orientations and the flexible is configured to flex in a manner such that, in each one of the multiple orientations, the guide surface follows a substantially arcuate path with a set radius, wherein the set radius varies between the multiple orientations.

30 Claims, 16 Drawing Sheets

(56) References Cited

U.S. PATENT DOCUMENTS

| | | | |
|---|---|---|---|
| 5,590,753 A | 1/1997 | Bertschi | |
| 5,638,659 A | 6/1997 | Moncrief | |
| 5,682,976 A | 11/1997 | Jorgensen | |
| 5,683,729 A | 11/1997 | Valles | |
| 5,711,411 A | 1/1998 | Zurweller | |
| 5,743,377 A | 4/1998 | Kronseder | |
| 5,762,116 A * | 6/1998 | Moore | B65B 39/145 198/803.11 |
| 5,782,339 A | 7/1998 | Drewitz | |
| 5,784,857 A | 7/1998 | Ford | |
| 5,819,911 A | 10/1998 | Ledingham | |
| 5,860,511 A | 1/1999 | Ensch | |
| 5,992,616 A | 11/1999 | Kliesow | |
| 6,050,396 A | 4/2000 | Moore | |
| 6,354,427 B1 | 3/2002 | Pickel | |
| 6,360,880 B1 | 3/2002 | Ouellette | |
| 6,378,695 B1 | 4/2002 | Rinne | |
| 6,454,084 B2 | 9/2002 | Csiki | |
| 6,520,318 B1 | 2/2003 | Humele | |
| 6,533,110 B1 | 3/2003 | Ledingham | |
| 6,578,702 B2 | 6/2003 | Falkowski | |
| 6,827,205 B2 | 12/2004 | Ledingham | |
| 6,889,823 B2 | 5/2005 | Delaporte | |
| 7,310,983 B2 | 12/2007 | Schill | |
| 7,398,871 B1 * | 7/2008 | Basgil | B65C 9/2217 198/478.1 |
| 7,431,150 B2 | 10/2008 | Ranger | |
| 7,530,453 B2 | 5/2009 | Ingraham | |
| 7,721,876 B2 | 5/2010 | Hartness | |
| 8,186,503 B1 | 5/2012 | Burchell | |
| 8,490,780 B2 | 7/2013 | Bell | |
| 8,695,787 B2 | 4/2014 | Bell | |
| 2002/0189923 A1 | 12/2002 | Ledingham | |
| 2003/0164280 A1 | 9/2003 | Delaporte | |
| 2004/0065525 A1 | 4/2004 | Bonatti | |
| 2006/0144015 A1 | 7/2006 | Cash, III | |
| 2010/0019331 A1 * | 1/2010 | Kilian | H10N 52/01 257/E43.002 |
| 2010/0200367 A1 | 8/2010 | Nguyen | |
| 2010/0294622 A1 | 11/2010 | Graffin | |
| 2011/0272246 A1 * | 11/2011 | Papsdorf | B65G 29/00 198/473.1 |
| 2015/0344236 A1 * | 12/2015 | Papsdorf | B65G 29/00 198/473.1 |
| 2016/0107845 A1 * | 4/2016 | Bruch | B65G 21/2072 198/473.1 |

FOREIGN PATENT DOCUMENTS

| | | |
|---|---|---|
| JP | H-1035879 A | 2/1998 |
| WO | WO-2011139577 A1 | 11/2011 |

* cited by examiner

US 11,975,927 B2

ROTATABLE MATERIAL TRANSFER SYSTEM WITH ADJUSTMENT AND RELATED SYSTEM COMPONENTS

TECHNICAL FIELD

This application relates generally rotating material transfer systems, such as starwheel conveyors and, more specifically, to a rotating material transfer system adaptable for use in handling items of different sizes and shapes.

BACKGROUND

The use of rotating material transfer systems, such as starwheel conveyors is known. Starwheel conveyors commonly include a rotatable starwheel in combination with a stationary outer guide plate or rail that follows at least part of the periphery of the starwheel to define an arcuate conveyance path along with items within holding slots of the starweheel are moved. In environments in which the starwheel conveyors are used to handle a variety of different items in corresponding runs, changeover between item sizes and shapes typically requires changeout of the starwheel structure and/or the outer guide plate, which is time consuming. In addition, maintaining a large number of changeover parts is generally undesirable given space limitations and the cost associated with additional sets of parts.

Accordingly, a rotatable material transfer system that is more readily adjustable to handle different items would be desirable.

SUMMARY

In one aspect, a rotatable material transfer system includes a rotatable conveyance assembly defining a plurality of peripheral item pockets, wherein each item pocket includes an item push surface for pushing an item located in the pocket as the rotatable conveyance assembly rotates about a central axis and an item guide surface that defines a pocket depth. A guide assembly extends along a portion of a periphery of the rotatable conveyance assembly and including a guide surface facing the item pockets. The rotatable material transfer system further includes one or more of the following features: (i) the rotatable conveyor assembly is configured to enable adjustment of a radial position of the item guide surface of each item pocket for adjusting pocket depth; (ii) the rotatable conveyor assembly is configured to enable adjustment of an arcuate offset distance between the item guide surface and the item push surface of each item pocket; and/or (iii) the guide surface is formed, at least in part, by at least one flexible rail that is adjustable between multiple orientations and the flexible rail is configured to flex in a manner such that, in each one of the multiple orientations, the guide surface follows a substantially arcuate path with a set radius, wherein the set radius varies between the multiple orientations.

In another aspect, a rotatable conveyance assembly for use in a rotatable material transfer system is provided, the rotatable conveyance assembly including a plurality of peripheral item pockets, wherein each item pocket includes an item push surface for pushing an item located in the pocket as the rotatable conveyance assembly rotates about a central axis and an item guide surface that defines a pocket depth. The rotatable conveyance assembly is configured to enable adjustment of (i) a radial position of the item guide surface of each item pocket for adjusting pocket depth and/or (ii) an arcuate offset distance between the item guide surface and the item push surface of each item pocket.

In a further aspect, a guide assembly for use in a material transfer system is provided, the guide assembly including at least one flexible rail that includes a guide surface. The flexible rail is adjustable between multiple orientations and is configured to flex in a manner such that, in each one of the multiple orientations, the guide surface follows a substantially arcuate path with a set radius, wherein the set radius varies between the multiple orientations.

The details of one or more embodiments are set forth in the accompanying drawings and the description below. Other features, items, and advantages will be apparent from the description and drawings, and from the claims.

DETAILED DESCRIPTION

Figure 1:
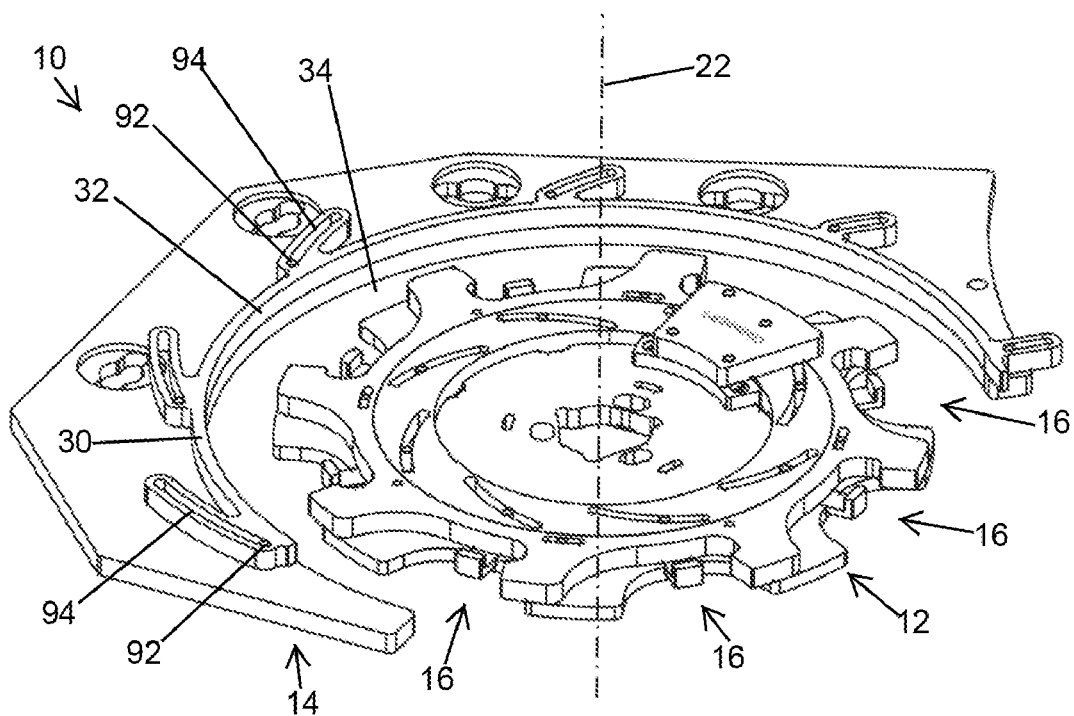
FIG. 1 shows a perspective view of one embodiment of a rotatable material transfer system.
Figure 2:
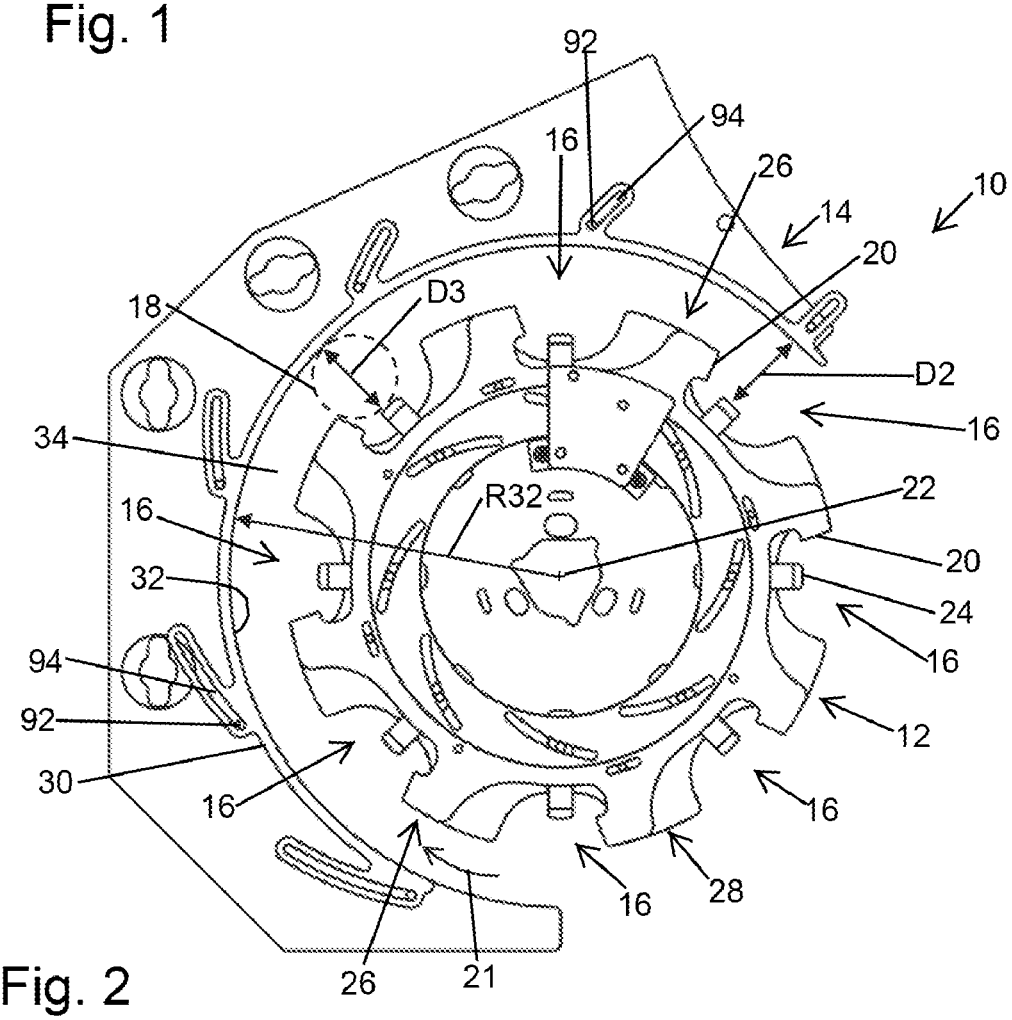
FIG. 2 shows a top plan view of the system.
Figure 3:
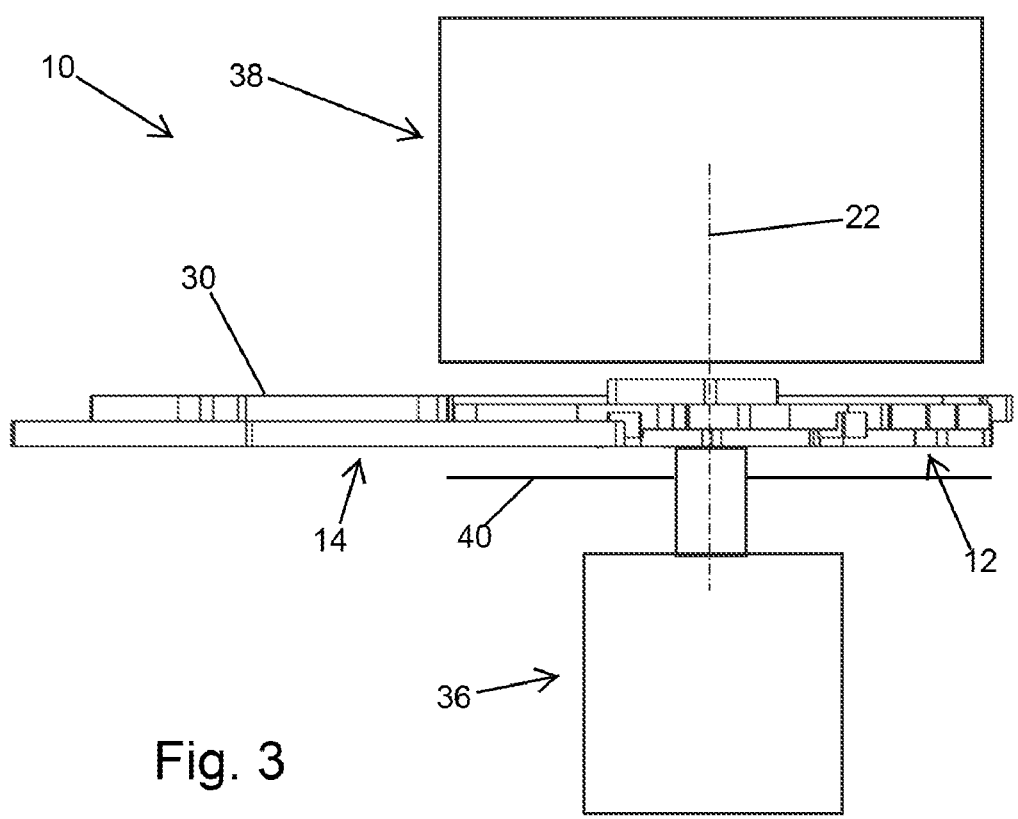
FIG. 3 shows a side elevation view of the system, with exemplary drive and/or processing equipment.
Figure 4:
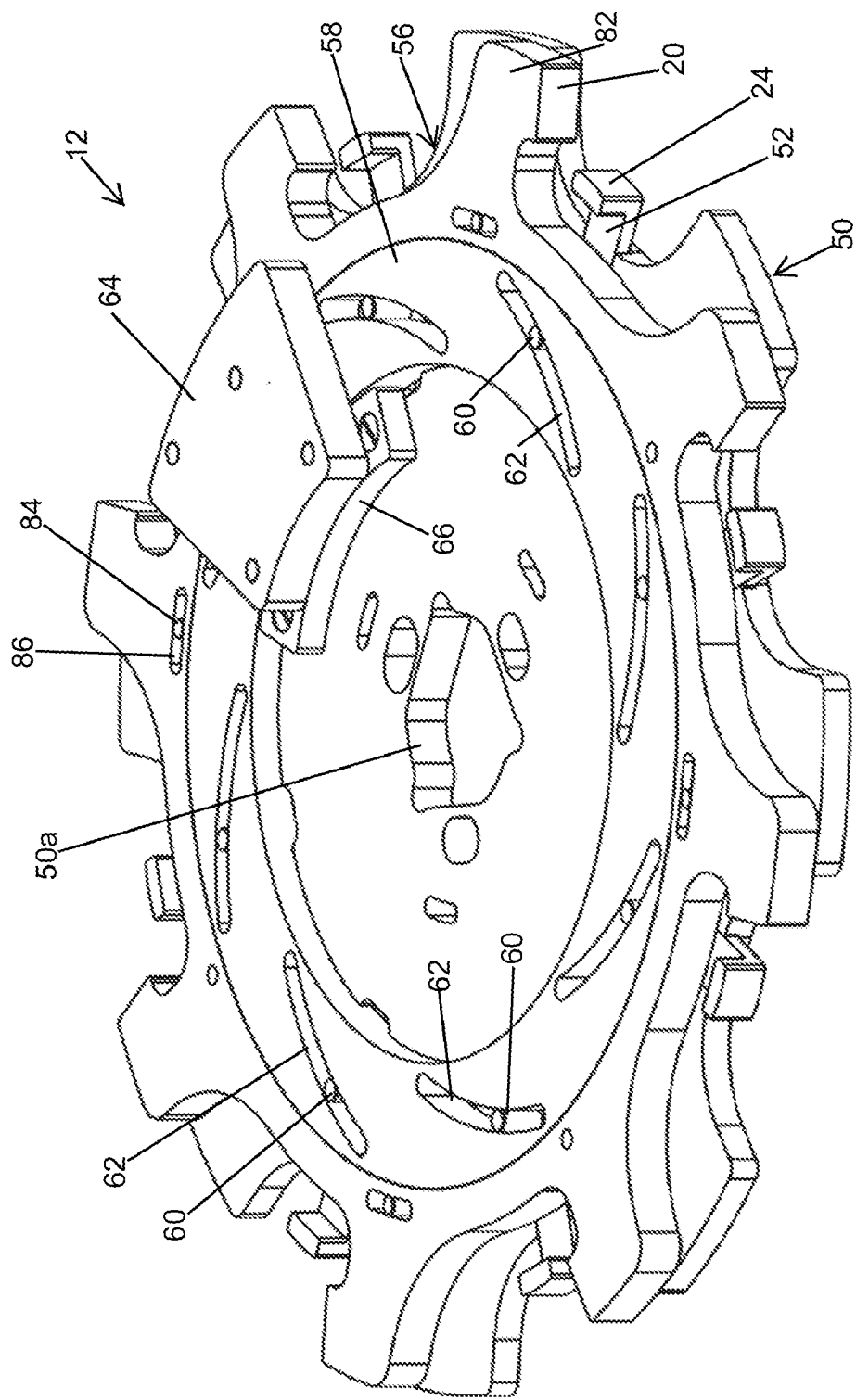
FIG. 4 shows a perspective view of the rotatable conveyor assembly of the system.
Figure 5:
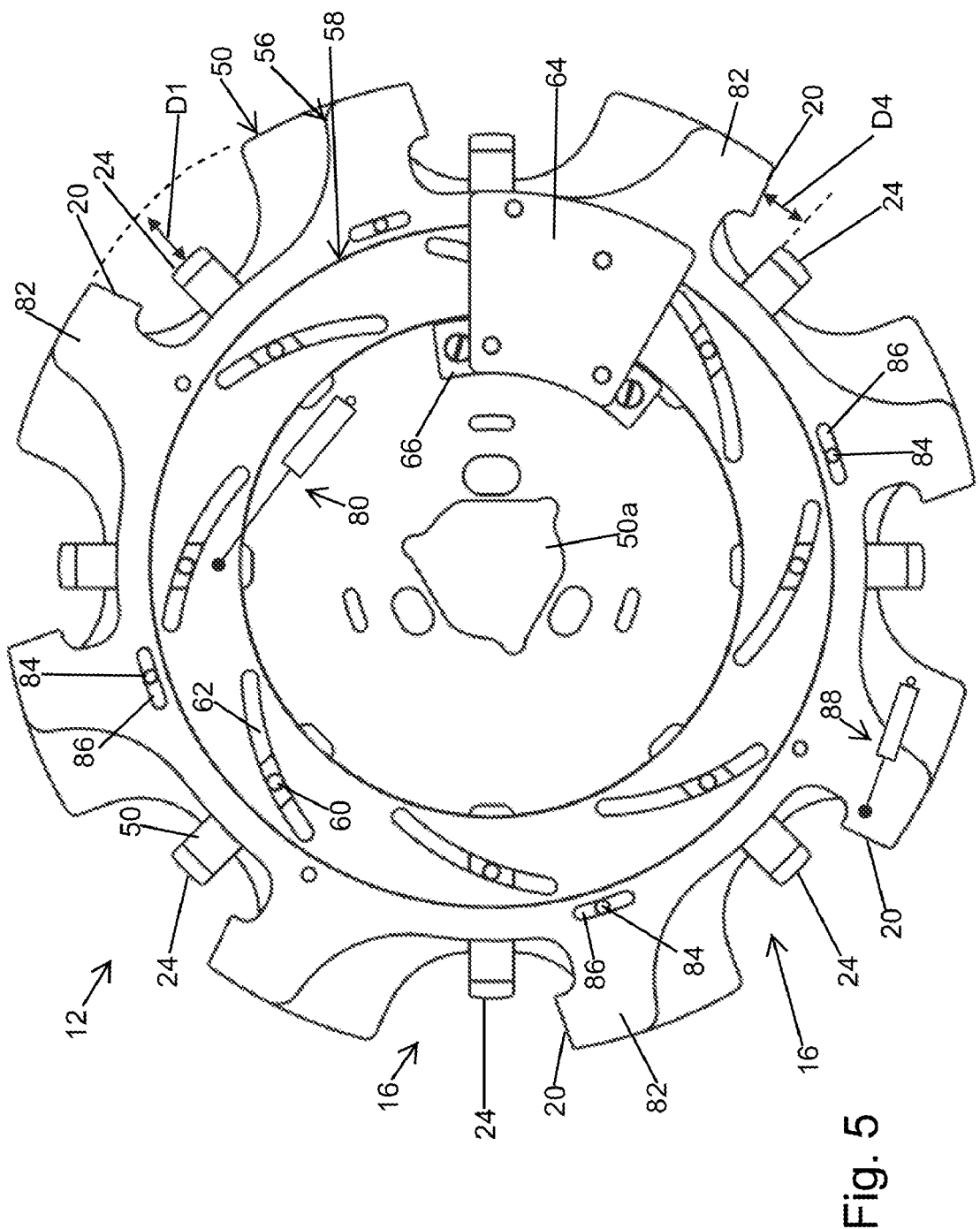
FIG. 5 shows a top plan view of the rotatable conveyor assembly.
Figure 6:
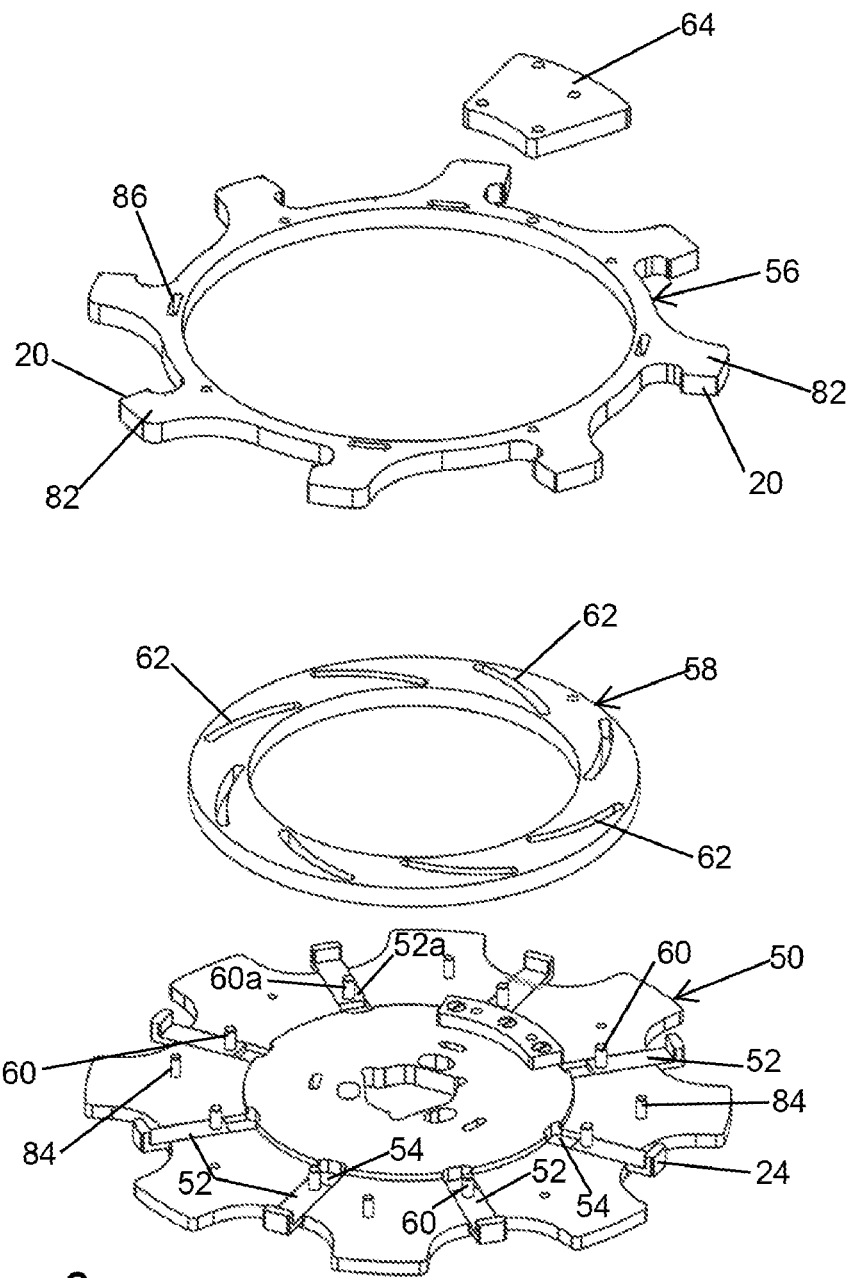
FIG. 6 shows an exploded perspective view of the rotatable conveyor assembly.
Figure 7:
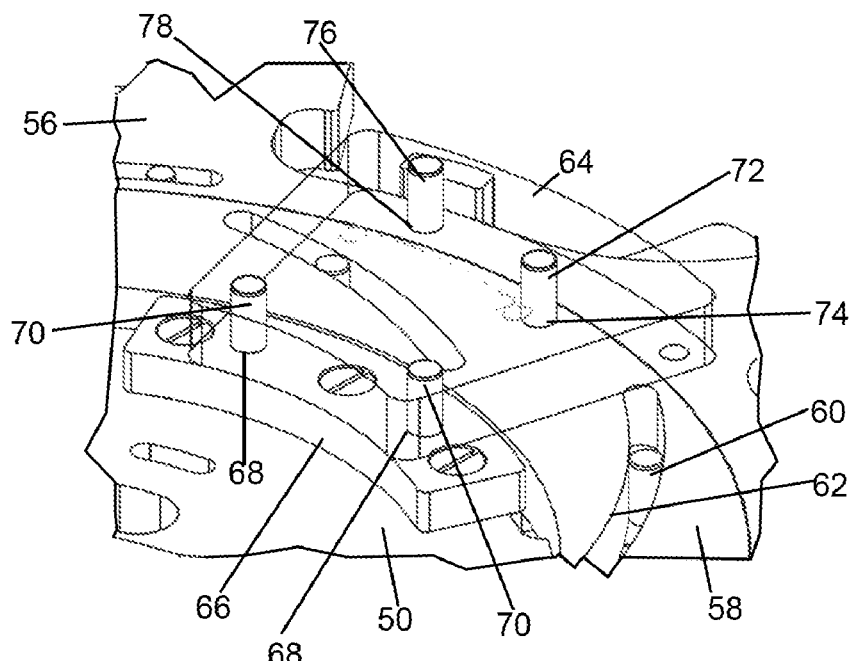
FIG. 7 shows a partial perspective view of the rotatable conveyor assembly with pin block shown transparent.

Referring to FIGS. 1-9B, an exemplary rotatable material transfer system 10 includes a rotatable conveyance assembly 12 and a guide assembly 14. The rotatable conveyance assembly 12 defines a plurality of peripheral item pockets 16 into which items, such as cans, bottles, buckets, cups, other containers or caps can be positioned so as to be movable by rotation of the conveyance assembly 12. Here, eight item pockets 16 are shown, but the number could be less than eight or more than eight. Typically, a consistent angular or circumferential spacing between the item pockets 16 of a given rotatable conveyance assembly 12 will be provided. An exemplary item 18 is shown in one item pocket 16. Each item pocket 16 includes an item push surface 20 for pushing the item located in the pocket as the rotatable conveyance assembly 12 rotates (here in rotational direction 21) about a central axis 22, and an item guide surface 24 that defines a pocket depth D1.

The guide assembly 14 extends along a portion 26 of a periphery 28 of the rotatable conveyance assembly 12 and includes a flexible rail 30 that includes a guide surface 32 facing the item pockets 16, thus forming a substantially arcuate path 34 for item movement. Here, the substantially arcuate path 34 encompassed by the guide surface 32 extends through approximately two-hundred degrees, but variances are possible (e.g., between 75 degrees and 200 degrees or more). Although a single flexible rail 30 is shown, systems with multiple sequentially positioned flexible rails to complete the full substantially arcuate path of transfer or conveyance are also possible. A radial distance D2 between the rail guide surface 32 and the item guide surface 24 of each item pocket is typically sized only slightly larger than a dimension D3 of the item 18 in the radial direction to facilitate controlled transport of the item along the path 34.

A rotatable material transfer system 10 of the type shown is useful in numerous applications. For example, the system could be used to transfer items from one processing station to another. The system could also be incorporated into a processing station, such as a station that cleans, fills or caps a container. By way of the exemplary schematic depiction in FIG. 3, the system 10 may include a drive arrangement 36 (e.g., motor and associated drive train) coupled to rotate the rotatable conveyance assembly 12 (e.g., via a central drive opening 50a). Likewise, if the system 10 forms part of a processing station, overhead processing equipment 38 (e.g., cleaning, filling, capping or other) may be provided. In some implementations, the system may include a continuous surface 40 (e.g., a slide surface or roller surface formed by series of rollers) on which the items are supported during rotational movement.

The illustrated system 10 includes multiple advantageous features that make it readily adaptable for handling items of various sizes and/or shapes.

Focusing on the rotatable conveyor assembly 12, the assembly 12 is configured to enable adjustment of a radial position of the item guide surface 24 of each item pocket 16 for adjusting pocket depth D1. That is, a radial spacing of the item guide surface 24 from the central axis 22 can be adjusted. Here, the rotatable conveyance assembly 12 includes a plate 50, wherein each item guide surface 24 is formed at the end of a respective arm 52 that is positioned on the plate 50 at a set circumferential position about the axis 22. The plate 50 may be formed with radial slide slots 54 into which the arms 52 are seated, allowing each arm 52 to move radially relative to the plate 50. The arms 52 are captured in the slots 54 by an overlaying plate 56 and an overlaying cam ring 58.

Figure 10:
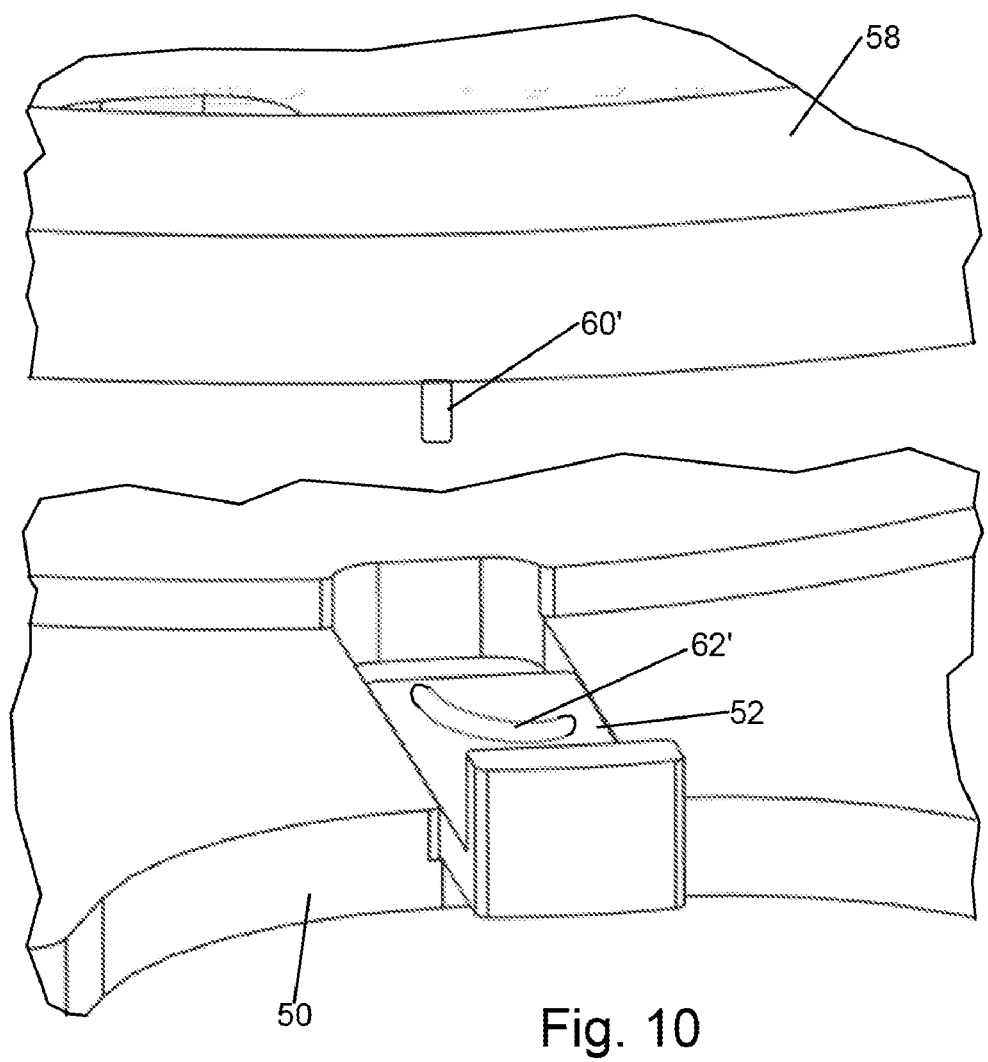
FIG. 10 shows a partial perspective view of an alternative embodiment of the rotatable conveyor assembly with projections and slots for the cam ring and arms reversed.

Each arm 52 has an associated cam part 60 and the cam ring 58 defines a plurality of corresponding cam parts 62 that engage with the cam parts 60 such that rotation of the cam ring 58 about the central axis 22 relative to the plate 50 causes radial movement of each arm 52 via interaction of the cam parts 60 and the cam parts 62. Here, the cam part 60 of each arm 52 is formed by a projection and the cam parts 62 of the cam ring are formed by slots into which the projections extend, and the interaction of the projections with the side surfaces of the slots during cam ring rotation causes the radial movement of the arms 52. The illustrated embodiment thus contemplates simultaneous movement of all of the arms 52 with a single adjustment via rotation of the cam ring 58. Here, the projections are formed by pins 60a that are fixed in and extend from openings 52a in the arms 52. However, the projections could take other forms, such as a projection feature that is molded integrally with or formed as a monolithic part of each arm 52. It is also recognized that, in an alternative embodiment, cam slots 62' could be incorporated into the arms 52 and cam projections 60' could extend from the cam ring 58, per FIG. 10.

In one implementation, the rotation of the cam ring 58 is achieved manually by a machine operator as part of a changeover process. A means for holding the cam ring 58 in any one of multiple rotational positions relative to the plate 50 is provided and, here, takes the form of one or more blocks 64 that are fixable to each of the plate 50, the cam ring 58 and the overlying plate 56. Here, the plate 50 includes a connection bar 66 fastened thereto that includes openings 68 that align with pins 70 that also engage the block 64, thus fixing the position of the block relative to the plate 50. Another block pin 72 engages an opening 74 in the cam ring 58 to fix the position of the block 64 relative to the cam ring 58. A further block pin 76 engages an opening 78 in the plate 56 to fix the rotational position of the block 64 relative to the plate (the purpose of which will be explained below). Thus, the block and pin arrangement fixes the rotational positions of each of the plate 50, the overlying plate 56 and the cam ring 58 relative to each other. It is recognized, however, that other means for holding could be utilized, such as other manually adjustable mechanical fixing structures (e.g., fasteners or clamps or clips).

Embodiments are also contemplated in which the rotation of the cam ring 58 relative to the plate 50 is achieved by a powered actuation structure. For example, one or more linear actuators 80 (e.g., electro-mechanical, pneumatic, or hydraulic), per FIG. 5, may be pivotably connected to each of the cam plate 50 and the cam ring 58 to rotate the cam ring 58, in which case the linear actuator 80, when not moving, would also serve as the means for holding the cam ring 58 in any one of multiple rotational positions. In another implementation, a portion of the internal periphery of the cam ring 58 could be formed with gear teeth that are driven by a drive gear associated with a motor, with the motor, when stationary, acting as the means for holding the cam ring 58 in any one of multiple rotational positions.

Embodiments in which a cam ring is not utilized at all are also contemplated. For example, each arm 52 may be manually movable and a set of positioning holes (on the plate and/or on the arm) could be used to set specific arm positions (e.g., using, fasteners, pins or clips). In such an embodiment, the arms would be radially movable independently of each other.

The rotatable conveyor assembly 12 is also configured to enable adjustment of an arcuate offset distance D4 between the item guide surface 24 and the item push surface 20 of each item pocket 16, again providing adaptability for item size and/or shape variations. This adjustment provides the ability to adapt the push surface contact point on items to further assure stability of items in the item pockets 16 (e.g., maintaining a center point of each item substantially centered on the guide surface 20 during item push). Each item push surface 24 is formed on a respective radially extending portion 82 of the 56 plate. The overlying plate 56 is mounted to permit some rotational movement about the central axis 22 relative to the plate 50 to reposition each item push surface 24. Here, a plurality of projections 84 (e.g., pins or other) and a corresponding plurality of arcuate slots 86 that receive the projections guide the rotational movement of plate 56 relative to the plate 50. Here, the projections 84 are fixed to the plate 50 and the slots 86 are incorporated into the overlying plate 56, but the slots could be in the plate 50 with the projections fixed to the plate 56. In either case, the movement of the overlying plate 56 can be achieved manually when a means for holding the overlying plate 56 in any one of multiple rotational positions relative to the plate 50 (e.g., the block and pin system described above) is removed. However, a powered actuation structure could also be used to achieve rotation of the plate 56, such as the exemplary linear actuator 88 shown in FIG. 5 (e.g., electro-mechanical, pneumatic, or hydraulic) pivotably connected to each of the plate 50 and the plate 56, in which case the linear actuator 88, when not moving, would also serve as the means for holding the plate 56 in any one of multiple rotational positions.

Figure 8:
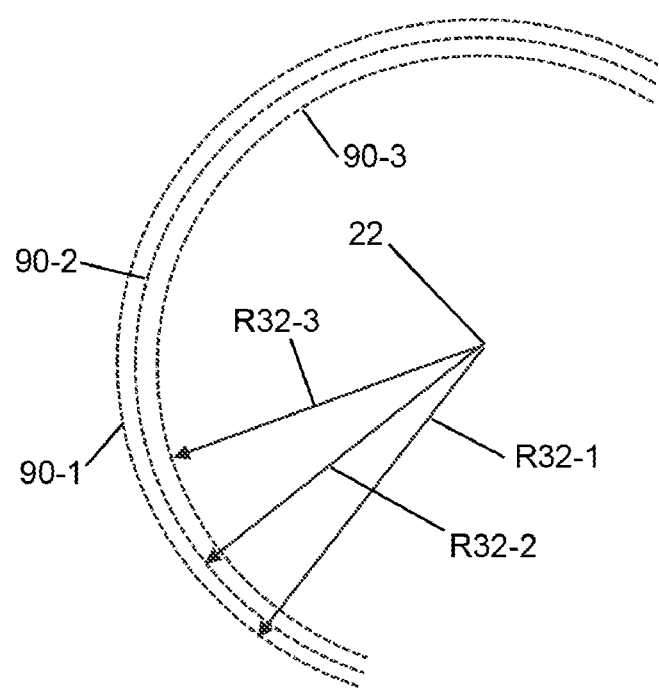
FIG. 8 shows a schematic top plan view of different guide surface arcs achievable by the flexible rail of the system.

The flexible rail 30 is adjustable between multiple orientations and is configured to flex in a manner such that, in each one of the multiple orientations, the guide surface 32 follows a substantially arcuate path with a set radius R32, wherein the set radius varies between the multiple orientations. The schematic depiction of FIG. 8 shows different exemplary substantially arcuate paths 90-1, 902 and 90-3 for the guide surface 32 as the flexible rail flexes, with corresponding set radii R32-1, R32-2 and R32-3 all substantially centered on the central axis 22.

A plurality of projections 92, and a corresponding plurality of slots 94 that receive the projections, are provided to control the flexing movement of the flexible rail 32. Here, the slots 94 are formed as part of the rail 30, and the projections 92 (e.g., pins or other) extend upward from a stationary support 96. However, the slots could be formed in the support 96, with the projections extending from the rail 30. In either case, the flexible rail 30 is movably mounted to the stationary support 96 and moves relative to the stationary support for purpose of adjustment between the multiple orientations, and positions of the projections 92 and shapes and orientations of the slots 94 are defined to force the flexible rail 30 to flex such that the guide surface 32 always follows or maintains a substantially arcuate path.

Figure 9B:
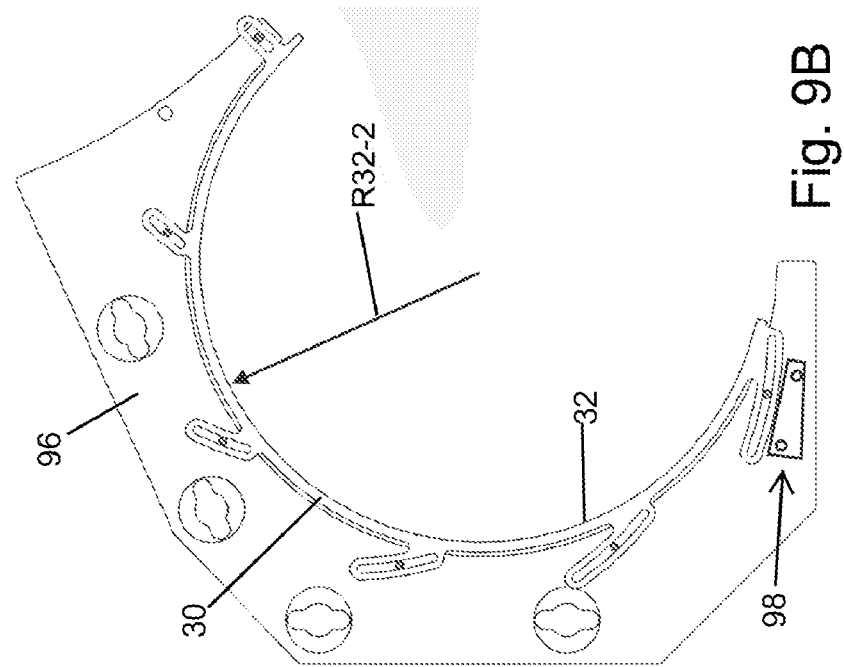
FIGS. 9A and 9B show top plan views of the flexible rail in different orientations.
Figure 9A:
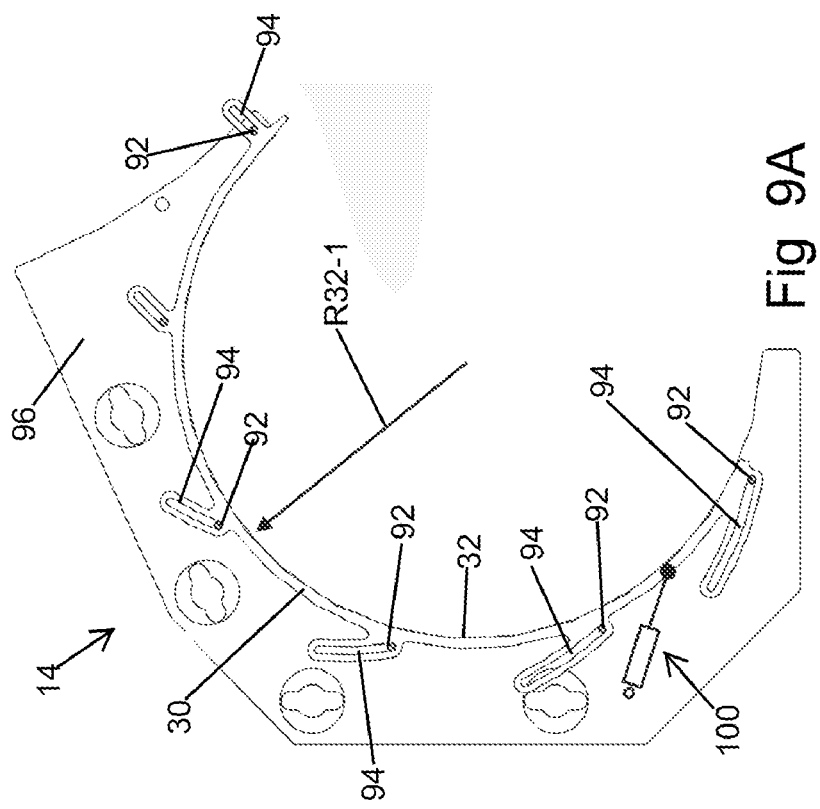

By way of example, the flexible rail 30 may be formed of a plastic material (e.g., HDPE, UHMW, Nylon, etc.) or, in some cases, could be formed of a metal material (e.g., thin aluminum or stainless). FIG. 9A shows a relaxed state of the flexible rail 30, with corresponding exemplary guide surface radius R32-1, and FIG. 9B shows a partially flexed state of the rail 30, with corresponding exemplary guide surface radius R32-2. A means for holding the flexible rail 30 in any one of multiple orientations on the stationary support 96 is provided and may take the form of a pin and block arrangement 98 that engages toward one end of the flexible rail 30 to hold it in flex. It is recognized, however, that other means for holding could be utilized, such as other manually adjustable mechanical fixing structures (e.g., fasteners or clamps or clips).

Embodiments are also contemplated in which the movement of the flexible rail 30 relative to the support 96 is achieved by a powered actuation structure. For example, one or more linear actuators 100 (e.g., electro-mechanical, pneumatic, or hydraulic), per FIG. 9A, may be pivotably connected to each of the support 96 and the rail 30 to move the rail 30 and cause flexing, in which case the linear actuator 100, when not moving, would also serve as the means for holding the rail 30 in any one of multiple rotational orientations.

The various adjustments provided by the above system make it quickly adaptable to handling items of various shapes and sizes.

It is to be clearly understood that the above description is intended by way of illustration and example only, is not intended to be taken by way of limitation, and that other changes and modifications are possible.

Figure 11:
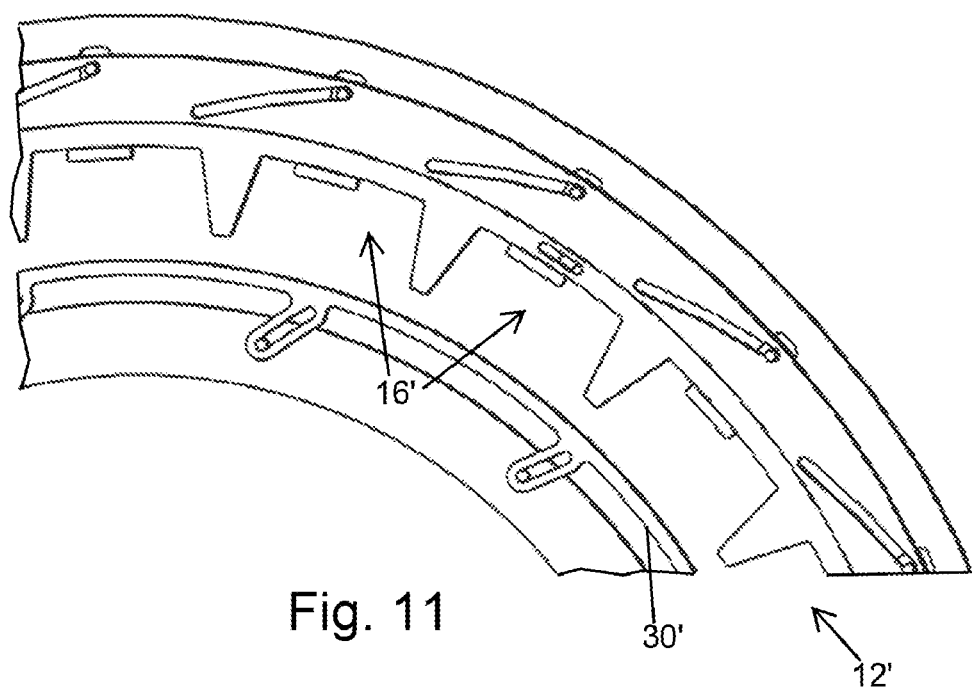
FIG. 11 shows a partial top plan view of an alternative embodiment in which the item pockets are located at a radially inwardly facing periphery of the assembly.

For example, the embodiment illustrated above shows an arrangement in which the item pockets are at the radially outwardly facing periphery of the rotatable conveyor assembly, with the item pockets extending radially inward. However, in other embodiments, such as that shown in FIG. 11, the item pockets 16' could be located at the radially inwardly facing periphery of the rotatable conveyor assembly (here ring-shaped assembly 12') and the item pockets 16' extend radially outward. In such an embodiment, the flexible rail 30' is located radially inward from the item pockets 16'.

Figure 12:
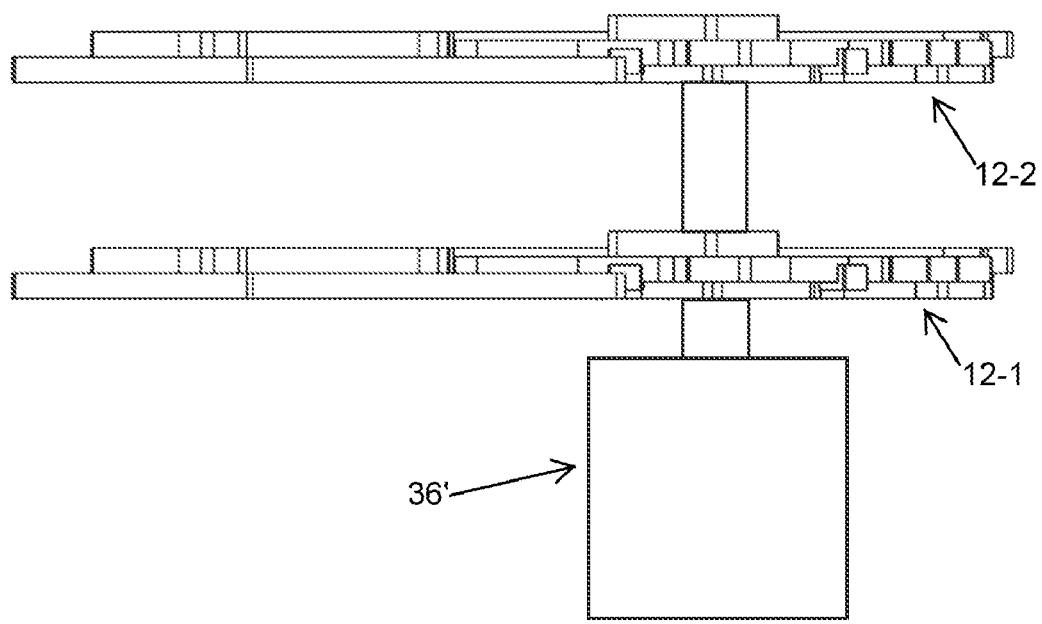
FIG. 12 shows a side elevation of an embodiment with multiple stacked rotatable conveyor assemblies.
Figure 13:
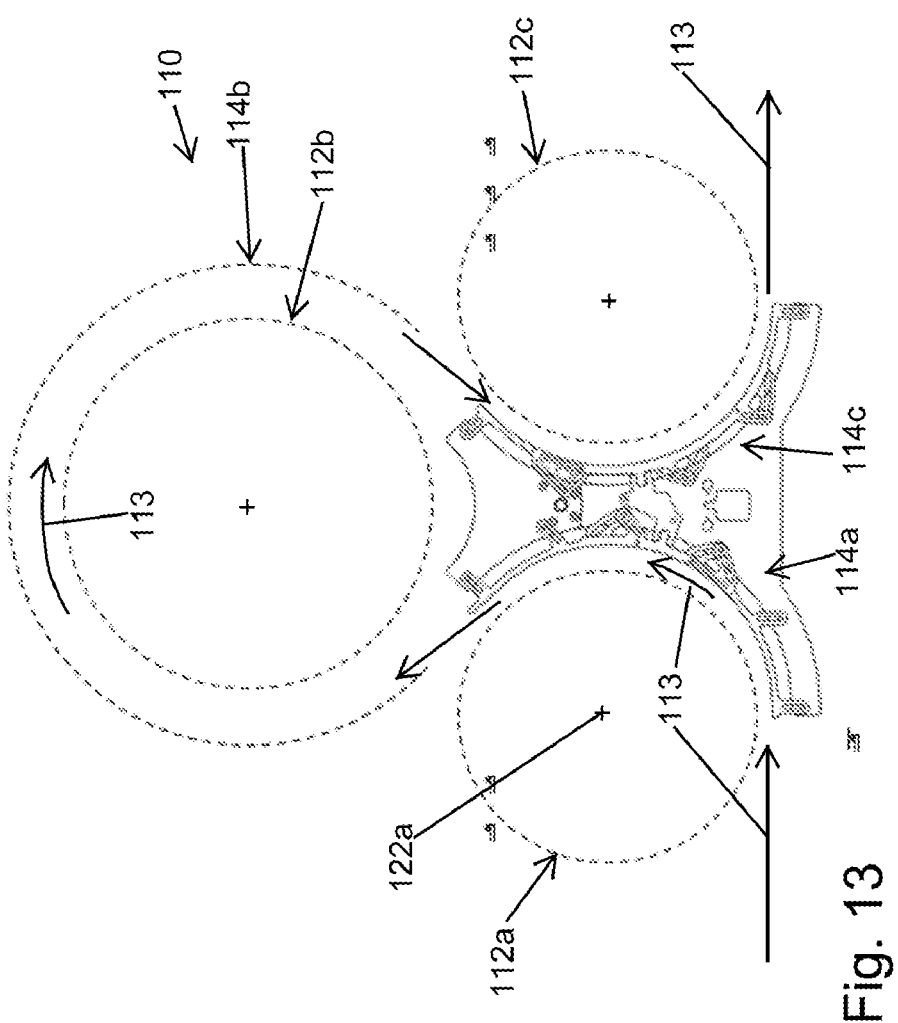
FIG. 13 shows a top plan view of another embodiment of a rotatable material transfer system.
Figure 14:
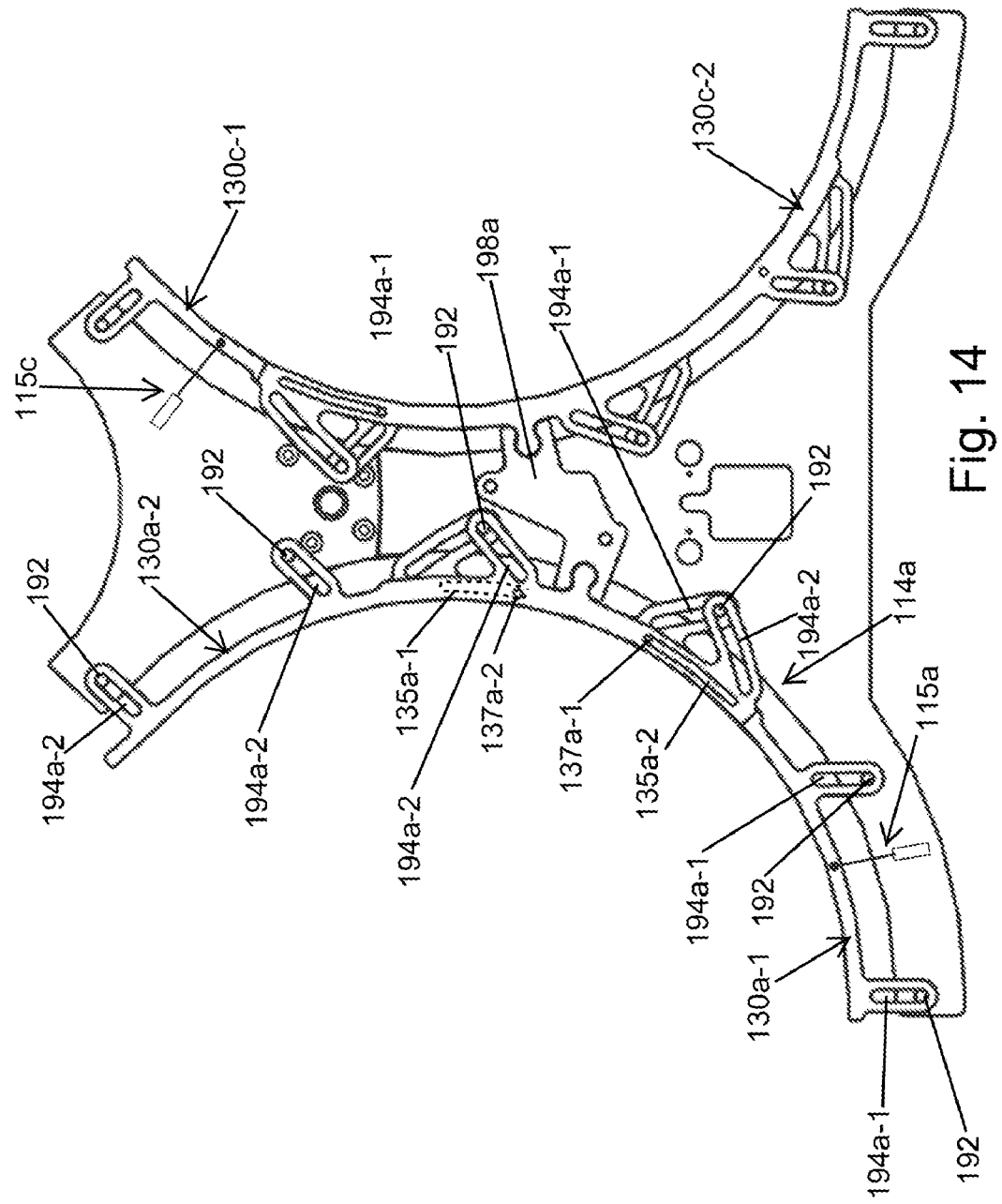
FIG. 14 shows a top plan view of a flexing rail assembly of the system of FIG. 13.
Figure 15:
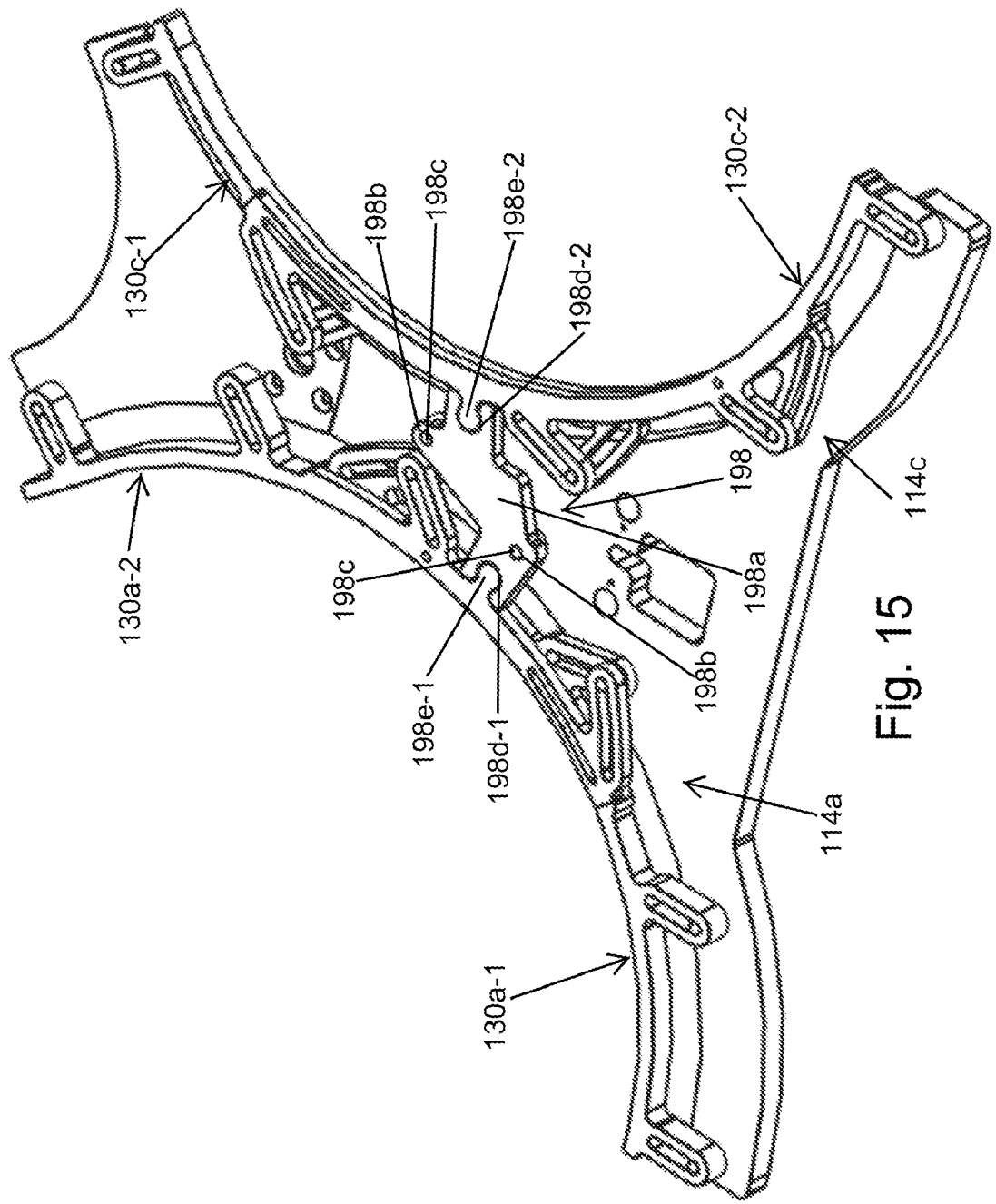
FIGS. 15-17 show perspective views of the flexing rail assemblies.
Figure 16:
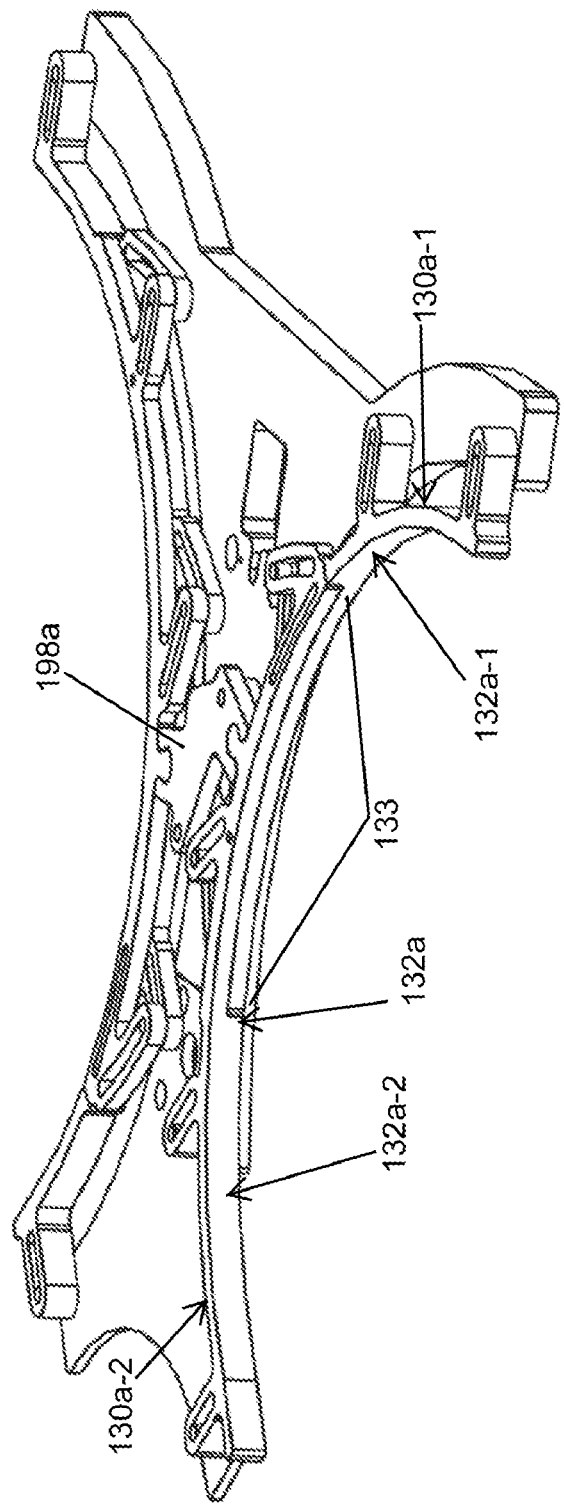
Figure 17:
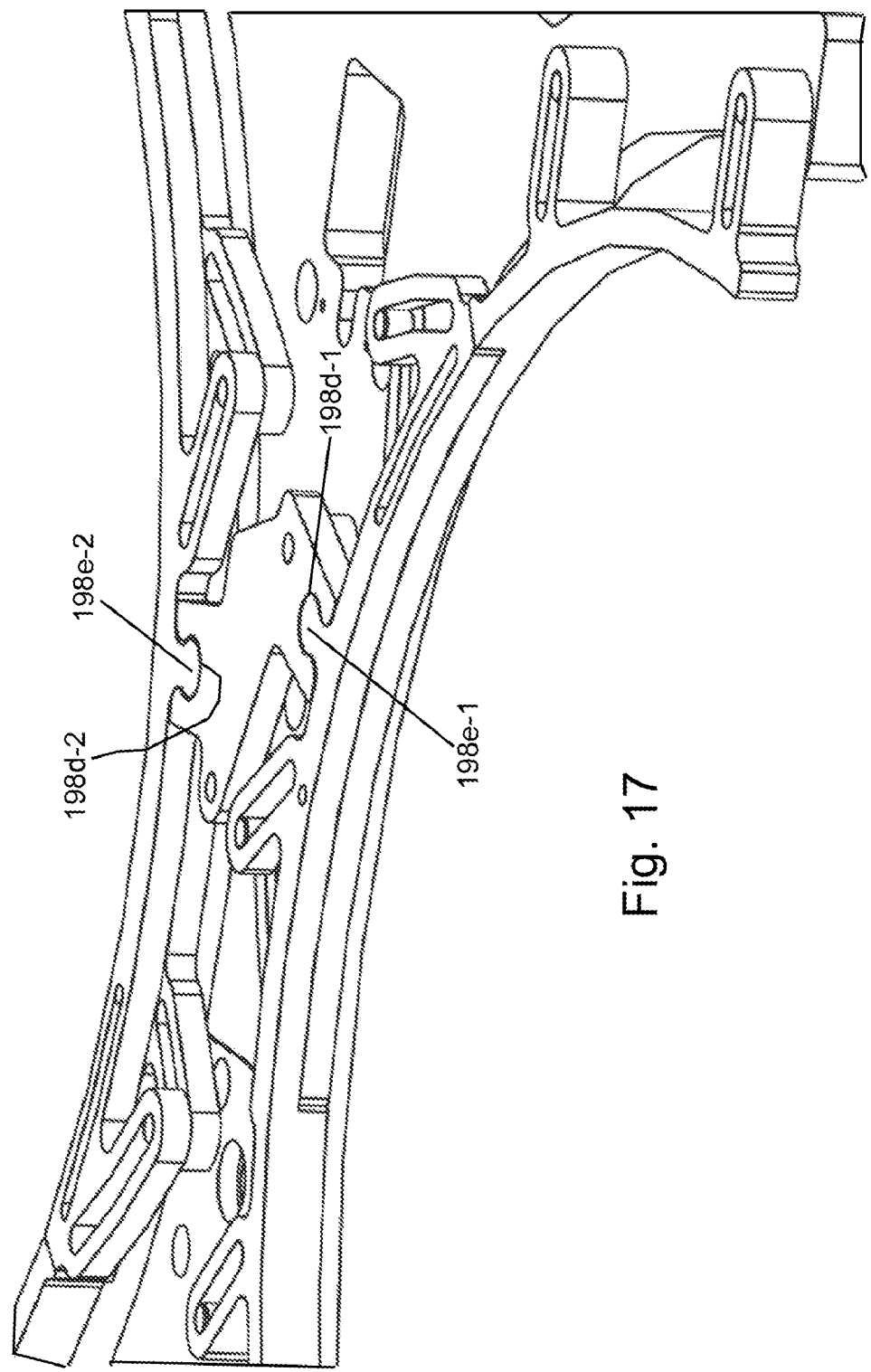

Moreover, embodiments in which multiple rotatable conveyor assemblies 12 and/or flexible rail arrangements are used in a stacked arrangement, per assemblies 12-1 and 12-2 of FIG. 12, are also contemplated, and may be useful for taller items. Such stacked assemblies could be rotated by a common drive arrangement 36'. Still other variations are possible.

As mentioned above, systems with multiple sequentially positioned flexible rails to complete the full substantially arcuate path of transfer or conveyance are also possible. By way of example, the system 110 shown in FIGS. 13-17, includes an input rotatable conveyance assembly 112a with associated guide assembly 114a, a processing rotatable conveyance assembly 112b, with associated guide assembly 114b and an output rotatable conveyance assembly 112c, with associated guide assembly 114c. The general movement path of items is depicted by arrows 113. Each guide assembly 114a and 114c is made up of multiple respective flexible rails 130a-1, 130a2 and 30c-1 and 130c-2. Although not shown in detail, the conveyance assemblies 112a, 112b, and 112c may all be of the adjustable type described above for system 10, and the guide assembly 114b may include multiple flexible rails.

Referring the guide assembly 114a, flexible rails 130a-1 and 130a-2 include surface portions 132a-1, 132a-2 that face the axis 122a of the rotatable conveyance assembly 112a and that partially overlap in region 133. The amount of overlap will vary depending upon the orientation of the guide assembly 114a. Thus, the total guide surface 132a for the guide assembly 114a is formed by the combined surface portions 132a-1, 132a-2. Each rail 130a-1, 130a-2 includes multiple respective slots 194a-1, 194a-2 that ride on pins 192 that project upward from a stationary support plate 196. Each flexible rail 130a-1, 130b-2 is movably mounted to the stationary support 196 and moves relative to the stationary support for purpose of adjustment between multiple orientations, and positions of the projections 192 and shapes and orientations of the slots 194a-1, 194a-2 are defined to force each flexible rail 130a-1, 130a-2 to flex such that the guide surface 132a always follows or maintains a substantially arcuate path. Notably, in this configuration, the slots 194a-1, 194a-2 that are located at the respective non-overlapping ends of each flexible rail 130a-1, 130a-2 extend substantially radially relative the central axis 122a of the rotatable conveyance assembly 112a, such that the angular arc length (in degrees) of the guide surface 132a remains substantially the same, regardless of the radius defining the substantially arcuate guide surface 132a. This helps assure that adjustment of the flexible rails does not leave any undesired gaps at the ends of the guide surface 132a.

The two flexible rails 130a-1, 130a-2 are also interconnected by a slot 135a-2 formed in rail 130a-2 and a pin 137a-1 that projects upwardly from rail 130a-1 into the slot 130a-2, and a slot 135a-1 formed in the rail 130a-1, and a pin 137a-2 that projects downwardly into the slot 135a-1. In this manner, a movement of one of the rails (e.g., 130a-1) causes a corresponding movement of the other of the rail (e.g., 130a-2) for the purpose of adjusting the radius of the substantially arcuate surface 132a, and the flexible rails 130a-1, 130a-2 are always locked to a same, common radius.

The guide assembly 114b is configured and operates substantially the same as the guide rail assembly 114a.

Here, a pin and block system 198 includes a central block 198a that includes openings 198b to engage pins 198c the are fixed to the support 196. The central block 198a also includes keyed edge openings 198d-1, 198d-2 that engage with locking projections 198e-1 and 198e-2 on the respective rails 130a-2. 130c-2. Thus, the pin and block system 198 holds the rails of each guide assembly 114a, 114c at desired positions for handling the same container size. The central block 198a can be changed out when the rails of the guide assemblies 114a, 114c are adjusted to adapt to different containers.

As above for system 10, the system 110 could include powered actuation structures for movement of each of the guide assemblies 114a, 114c. For example, one or more linear actuators 115a, 115c (e.g., electro-mechanical, pneumatic, or hydraulic) could be provided.

All of the above the flexible rail arrangement may be useful in applications other than rotatable material transfer systems, such as at the inside or outside radius of a conveyor elbow.

Inventive aspects include, but are not limited to, the following:

A1. A rotatable material transfer system, comprising: a rotatable conveyance assembly defining a plurality of peripheral item pockets, wherein each item pocket includes an item push surface for pushing an item located in the pocket as the rotatable conveyance assembly rotates about a central axis and an item guide surface that defines a pocket depth; and a guide assembly extending along a portion of a periphery of the rotatable conveyance assembly and including a guide surface facing the item pockets; wherein the rotatable material transfer system further includes one or more of the following features: (i) the rotatable conveyor assembly is configured to enable adjustment of a radial position of the item guide surface of each item pocket for adjusting pocket depth; and/or (ii) the rotatable conveyor assembly is configured to enable adjustment of an arcuate offset distance between the item guide surface and the item push surface of each item pocket; and/or (iii) the guide surface is formed, at least in part, by at least one flexible rail that is adjustable between multiple orientations and the flexible rail is configured to flex in a manner such that, in each one of the multiple orientations, the guide surface follows a substantially arcuate path with a set radius, wherein the set radius varies between the multiple orientations.

A2. The rotatable material transfer system of aspect A1, wherein the rotatable conveyance assembly includes a first plate, wherein each item guide surface is formed at the end of a respective arm that is positioned on the first plate at a set circumferential position.

A3. The rotatable material transfer system of any of aspects A1-A2, wherein each arm is radially movable relative to the first plate.

A4. The rotatable material transfer system of any of aspects A1-A3, wherein the arms are radially movable independently of each other and/or simultaneously with each other.

A5. The rotatable material transfer system of any of aspects A1-A4, further comprising: each arm having an associated first cam part; a cam ring mounted to the first plate and defining a plurality of second cam parts, each second cam part engaged with a respective one of the first cam parts such that rotation of the cam ring about the central axis relative to the first plate causes radial movement of each arm via interaction of the first cam parts and the second cam parts.

A6. The rotatable material transfer system of any of aspects A1-A5, wherein each first cam part comprises one of a projection or a slot, each second cam part comprises the other of a projection or a slot, and each projection rides in one of the slots.

A7. The rotatable material transfer system of any of aspects A1-A6, further comprising means for holding the cam ring in any one of multiple rotational positions relative to the first plate.

A8. The rotatable material transfer system of any of aspects A1-A7, wherein the means for holding the cam ring comprises at least one of a manually adjustable mechanical fixing structure or a powered actuation structure.

A9. The rotatable material transfer system of any of aspects A1-A8, wherein the rotatable conveyance assembly includes a first plate and a second plate mounted adjacent the first plate, wherein each item push surface is formed on a respective radially extending portion of the second plate, wherein the second plate is mounted to permit at least some rotational movement about the central axis relative to the first plate to reposition each item push surface.

A10. The rotatable material transfer system of any of aspects A1-A9, further comprising a plurality of projections and a corresponding plurality of arcuate slots that receive the projections to guide rotational movement of the second plate relative to the first plate.

A11. The rotatable material transfer system of any of aspects A1-A10, further comprising means for holding the second plate in any one of multiple rotational positions relative to the first plate.

A12. The rotatable material transfer system of aspect A11, wherein the means for holding the second plate comprises at least one of a manually adjustable mechanical fixing structure or a powered actuation structure.

A13. The rotatable material transfer system of any of aspects A1-A12, wherein the guide surface is formed, at least in part, by at least one flexible rail and the flexible rail is movably mounted to a stationary support and moves relative to the stationary support for purpose of adjustment between the multiple orientations.

A14. The rotatable material transfer system of any of aspects A13, further comprising a plurality of projections and a corresponding plurality of slots that receive the projections to guide movement of the flexible rail.

A15. The rotatable material transfer system of aspect A14, wherein positions of the projections and shapes and orientations of the slots are defined to force the flexible rail to flex such that the guide surface always follows a substantially arcuate path.

A16. The rotatable material transfer system of any of aspect A13-A15, further comprising means for holding the flexible rail in any one of multiple orientations on the stationary support.

A17. The rotatable material transfer system of aspect A16, wherein the means for holding the flexible rail comprises at least one of a manually adjustable mechanical fixing structure or a powered actuation structure.

A18. The rotatable material transfer system of any of aspects A1-A17, wherein the at least one flexible rail comprises first and second flexible rails that partially overlap to define the guide surface, the first flexible rail linked to the second flexible rail such that movement of the first flexible rail causes movement of the second flexible rail.

A19. The rotatable material transfer system of any of aspects A1-A18, wherein the periphery of the rotatable conveyance assembly is a radially outwardly facing periphery and the item pockets are located along the radially outwardly facing periphery and extend radially inward.

A20. The rotatable material transfer system of any of aspects A1-A18, wherein the periphery of the rotatable conveyance assembly is a radially inwardly facing periphery and the item pockets are located along the radially inwardly facing periphery and extend radially outward.

A21. The rotatable material transfer system of any of aspects A1-A20, wherein the rotatable conveyance assembly is one of multiple rotatable conveyance assemblies that are in a stacked arrangement.

A22. A rotatable conveyance assembly for use in a rotatable material transfer system, the rotatable conveyance assembly comprising: a plurality of peripheral item pockets, wherein each item pocket includes an item push surface for pushing an item located in the pocket as the rotatable conveyance assembly rotates about a central axis and an item guide surface that defines a pocket depth, wherein the rotatable conveyance assembly is configured to enable adjustment of (i) a radial position of the item guide surface of each item pocket for adjusting pocket depth and/or (ii) an arcuate offset distance between the item guide surface and the item push surface of each item pocket.

A23. The rotatable conveyance assembly of aspect A22, wherein the rotatable conveyance assembly is configured to enable adjustment of both (i) the radial position of the item guide surface of each item pocket for adjusting pocket depth and (ii) the arcuate offset distance between the item guide surface and the item push surface of each item pocket.

A24. The rotatable conveyance assembly of aspect A22 of A23, wherein the rotatable conveyance assembly includes a first plate, wherein each item guide surface is formed at the end of a respective arm that is mounted to the first plate at a set circumferential position.

A25. The rotatable conveyance assembly of aspect A24, wherein each arm is radially movable relative to the first plate.

A26. The rotatable conveyance assembly of aspect A25, wherein the arms are radially movable independently of each other and/or simultaneously with each other.

A27. The rotatable conveyance assembly of aspect A25 or A26, further comprising: each arm having an associated first cam part; a cam ring mounted to the first plate and defining a plurality of second cam parts, each second cam part engaged with a respective one of the first cam parts such that rotation of the cam ring about the central axis relative to the first plate causes radial movement of each arm via interaction of the first cam parts and the second cam parts.

A28. The rotatable conveyance assembly of aspect A27, wherein each first cam part comprises one of a projection or a slot, each second cam part comprises the other of a projection or a slot, and each projection rides in one of the slots.

A29. The rotatable conveyance assembly of aspect A27 or A28, further comprising means for holding the cam ring in any one of multiple rotational positions relative to the first plate.

A30. The rotatable conveyance assembly of aspect A29, wherein the means for holding the cam ring comprises at least one of a manually adjustable mechanical fixing structure or a powered actuation structure.

A31. The rotatable conveyance assembly of any of aspects A22-A30, wherein the rotatable conveyance assembly includes a first plate and a second plate mounted adjacent the first plate, wherein each item push surface is formed on a respective radially extending portion of the second plate, wherein the second plate is mounted to permit at least some rotational movement about the central axis relative to the first plate to reposition each item push surface.

A32. The rotatable conveyance assembly of aspect A31, further comprising a plurality of projections and a corresponding plurality of arcuate slots that receive the projections to guide rotational movement of the second plate relative to the first plate.

A33. The rotatable conveyance assembly of aspect A31 or A32, further comprising means for holding the second plate in any one of multiple rotational positions relative to the first plate.

A34. The rotatable conveyance assembly of aspect A33, wherein the means for holding the second plate comprises at least one of a manually adjustable mechanical fixing structure or a powered actuation structure.

A35. The rotatable conveyance assembly of any of aspects A22-A34, wherein the item pockets are located along a radially outwardly facing periphery and extend radially inward.

A36. The rotatable conveyance assembly of any of aspects A22-A34, wherein the item pockets are located along a radially inwardly facing periphery and extend radially outward.

A37. A guide assembly for use in a material transfer system, the guide assembly including at least one flexible rail that includes a guide surface, wherein the flexible rail is adjustable between multiple orientations and is configured to flex in a manner such that, in each one of the multiple orientations, the guide surface follows a substantially arcuate path with a set radius, wherein the set radius varies between the multiple orientations.

A38. The guide assembly of aspect A37, wherein the flexible rail is movably mounted to a stationary support and moves relative to the stationary support for purpose of adjustment between the multiple orientations.

A39. The guide assembly of aspect A37 or A38, further comprising a plurality of projections and a corresponding plurality of slots that receive the projections to guide movement of the flexible rail.

A40. The guide assembly of aspect A39, wherein positions of the projections and shapes and orientations of the slots are defined to force the flexible rail to flex such that the guide surface always follows a substantially arcuate path.

A41. The guide assembly of aspect A38 or A39, further comprising means for holding the flexible rail in any one of multiple orientations on the stationary support.

A42. The guide assembly of aspect A41, wherein the means for holding the flexible rail comprises at least one of a manually adjustable mechanical fixing structure or a powered actuation structure.

A43. The guide assembly of any of aspects A37-A42, wherein the at least one flexible rail comprises first and second flexible rails that partially overlap to define the guide surface, the first flexible rail linked to the second flexible rail such that movement of the first flexible rail causes movement of the second flexible rail.

Still other variations are possible.

The invention claimed is:

1. A rotatable material transfer system, comprising:
a rotatable conveyance assembly defining a plurality of peripheral item pockets, wherein each item pocket includes an item push surface for pushing an item located in the pocket as the rotatable conveyance assembly rotates about a central axis and an item guide surface that defines a pocket depth; and
a guide assembly extending along a portion of a periphery of the rotatable conveyance assembly and including a guide surface facing the item pockets;
wherein the guide surface is formed, at least in part, by at least one flexible rail that is adjustable between multiple orientations and the at least one flexible rail is configured to flex in a manner such that, in each one of the multiple orientations, the guide surface follows a substantially arcuate path with a set radius, wherein the set radius varies between the multiple orientations, and wherein the at least one flexible rail comprises first and second flexible rails that partially overlap along the substantially arcuate path to define an angular arc length of the guide surface, the first flexible rail linked to the second flexible rail such that movement of the first flexible rail causes movement of the second flexible rail.

2. The rotatable material transfer system of claim 1, wherein the rotatable conveyance assembly includes a first plate, wherein each item guide surface is formed at the end of a respective arm that is positioned on the first plate at a set circumferential position.

3. The rotatable material transfer system of claim 2, wherein each arm is radially movable relative to the first plate.

4. The rotatable material transfer system of claim 3, wherein the arms are radially movable independently of each other and/or simultaneously with each other.

5. The rotatable material transfer system of claim 3, further comprising:
each arm having an associated first cam part;
a cam ring mounted to the first plate and defining a plurality of second cam parts, each second cam part engaged with a respective one of the first cam parts such that rotation of the cam ring about the central axis relative to the first plate causes radial movement of each arm via interaction of the first cam parts and the second cam parts.

6. The rotatable material transfer system of claim 4, wherein each first cam part comprises one of a projection or a slot, each second cam part comprises the other of a projection or a slot, and each projection rides in one of the slots.

7. The rotatable material transfer system of claim 5, further comprising means for holding the cam ring in any one of multiple rotational positions relative to the first plate.

8. The rotatable material transfer system of claim 7, wherein the means for holding the cam ring comprises at least one of a manually adjustable mechanical fixing structure or a powered actuation structure.

9. The rotatable material transfer system of claim 1, wherein the rotatable conveyance assembly includes a first plate and a second plate mounted adjacent the first plate, wherein each item push surface is formed on a respective radially extending portion of the second plate, wherein the second plate is mounted to permit at least some rotational movement about the central axis relative to the first plate to reposition each item push surface.

10. The rotatable material transfer system of claim 9, further comprising a plurality of projections and a corresponding plurality of arcuate slots that receive the projections to guide rotational movement of the second plate relative to the first plate.

11. The rotatable material transfer system of claim 9, further comprising means for holding the second plate in any one of multiple rotational positions relative to the first plate.

12. The rotatable material transfer system of claim 11, wherein the means for holding the second plate comprises at least one of a manually adjustable mechanical fixing structure or a powered actuation structure.

13. The rotatable material transfer system of claim 1, wherein the first and second flexible rails are movably mounted to a stationary support and move relative to the stationary support for purpose of adjustment between the multiple orientations.

14. The rotatable material transfer system of claim 13, further comprising a plurality of projections and a corresponding plurality of slots that receive the projections to guide movement of the first and second flexible rails.

15. The rotatable material transfer system of claim 14, wherein positions of the projections and shapes and orientations of the slots are defined to force the first and second flexible rails to flex such that the guide surface always follows a substantially arcuate path.

16. The rotatable material transfer system of claim 13, further comprising means for holding the first and second flexible rails in any one of multiple orientations on the stationary support.

17. The rotatable material transfer system of claim 1, wherein the first and second flexible rails are configured to move relative to each other such that the angular arc length of the guide surface remains substantially the same, regardless of the set radius.

18. The rotatable material transfer system of claim 1, wherein the rotatable conveyance assembly is one of multiple rotatable conveyance assemblies that are in a stacked arrangement.

19. The rotatable material transfer system of claim 1, wherein the periphery of the rotatable conveyance assembly is a radially outwardly facing periphery and the item pockets are located along the radially outwardly facing periphery and extend radially inward.

20. The rotatable material transfer system of claim 1, wherein the periphery of the rotatable conveyance assembly is a radially inwardly facing periphery and the item pockets are located along the radially inwardly facing periphery and extend radially outward.

21. A guide assembly for use in a material transfer system, the guide assembly including at least one flexible rail that includes a guide surface, wherein the flexible rail is adjustable between multiple orientations and is configured to flex in a manner such that, in each one of the multiple orientations, the guide surface follows a substantially arcuate path with a set radius, wherein the set radius varies between the multiple orientations, wherein the flexible rail comprises a plurality of rail slots, having different slot configurations, that force the flexible rail to flex such that the guide surface always follows a substantially arcuate path.

22. The guide assembly of claim 21, wherein the flexible rail is movably mounted to a stationary support and moves relative to the stationary support for purpose of adjustment between the multiple orientations.

23. The guide assembly of claim 22, further comprising a plurality of projections on the stationary support, wherein the plurality of rail slots receive the projections to guide movement of the flexible rail.

24. The guide assembly of claim 23, wherein positions of the projections and shapes and orientations of the rail slots are defined to force the flexible rail to flex such that the guide surface always follows a substantially arcuate path.

25. The guide assembly of claim 22, further comprising means for holding the flexible rail in any one of multiple orientations on the stationary support.

26. The guide assembly of claim 21, wherein the at least one flexible rail comprises first and second flexible rails that partially overlap to define the guide surface, the first flexible rail linked to the second flexible rail such that movement of the first flexible rail causes movement of the second flexible rail.

27. A rotatable material transfer system comprising a rotatable conveyance assembly and the guide assembly of claim 21 located along a periphery of the rotatable conveyance assembly.

28. A guide assembly for use in a material transfer system, the guide assembly including at least one flexible rail that includes a guide surface, wherein the at least one flexible rail is adjustable between multiple orientations and is configured to flex in a manner such that, in each one of the multiple orientations, the guide surface follows a substantially arcuate path with a set radius, wherein the set radius varies between the multiple orientations, wherein the at least one flexible rail comprises first and second flexible rails that partially overlap along the substantially arcuate path to define an angular arc length of the guide surface, the first flexible rail linked to the second flexible rail such that movement of the first flexible rail causes movement of the second flexible rail.

29. The guide assembly of claim 28, wherein the first and second flexible rails are configured to move relative to each other such that the angular arc length of the guide surface remains substantially the same, regardless of the set radius.

30. A rotatable material transfer system comprising a rotatable conveyance assembly and the guide assembly of claim 28 located along a periphery of the rotatable conveyance assembly.

* * * * *